(12) United States Patent
Anderson et al.

(10) Patent No.: US 10,955,299 B2
(45) Date of Patent: Mar. 23, 2021

(54) FLUID EJECTION DIES INCLUDING STRAIN GAUGE SENSORS

(71) Applicant: HEWLETT-PACKARD DEVELOPMENT COMPANY, L.P., Spring, TX (US)

(72) Inventors: Daryl E Anderson, Corvallis, OR (US); James Gardner, Corvallis, OR (US); Berkeley Fisher, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/490,975

(22) PCT Filed: Apr. 24, 2017

(86) PCT No.: PCT/US2017/029115
§ 371 (c)(1),
(2) Date: Sep. 4, 2019

(87) PCT Pub. No.: WO2018/199888

PCT Pub. Date: Nov. 1, 2018

(65) Prior Publication Data

US 2020/0033203 A1 Jan. 30, 2020

(51) Int. Cl.
*B41J 2/165* (2006.01)
*G01L 1/16* (2006.01)
*B41J 2/045* (2006.01)

(52) U.S. Cl.
CPC .............. *G01L 1/16* (2013.01); *B41J 2/0451* (2013.01); *B41J 2/04555* (2013.01); *B41J 2/04586* (2013.01); *B41J 2/16517* (2013.01); *B41J 2/16579* (2013.01)

(58) Field of Classification Search
CPC ....... G01L 1/26; B41J 2/0451; B41J 2/04555; B41J 2/04586; B41J 2/16517; B41J 2/16579
See application file for complete search history.

(56) References Cited

U.S. PATENT DOCUMENTS

| 5,418,557 A | * | 5/1995 | Pullen ..................... B41J 2/115 347/7 |
| 7,229,147 B2 | | 6/2007 | Hasebe et al. |
| 7,540,580 B2 | | 6/2009 | Oku |
| 8,827,425 B2 | | 9/2014 | Sugahara et al. |

(Continued)

FOREIGN PATENT DOCUMENTS

| EP | 1457766 | 9/2004 |
| WO | WO-2010089234 | 8/2010 |
| WO | WO-2017025830 | 2/2017 |

OTHER PUBLICATIONS

Zlebic, et al. Inkjet Printed Resistive Strain Gages on Flexible Substrates. Faculty of Technical Sciences, University of Novi Sad, Serbia.

*Primary Examiner* — Sharon Polk
(74) *Attorney, Agent, or Firm* — Dicke Billig & Czaja PLLC (57) ABSTRACT

A fluid ejection die includes a plurality of nozzles to eject fluid drops and a plurality of strain gauge sensors to sense strain. Each strain gauge sensor corresponds to a nozzle and passes the sensed strain to a controller to determine the health of the nozzle based on the sensed strain.

18 Claims, 6 Drawing Sheets

(56) References Cited

U.S. PATENT DOCUMENTS

2005/0151763 A1\* 7/2005 Hasebe ............... B41J 2/16579
                                                            347/6
2010/0201728 A1   8/2010 Silverbrook
2013/0176359 A1\* 7/2013 Roberts ............... B41J 2/16552
                                                            347/28

\* cited by examiner

FLUID EJECTION DIES INCLUDING STRAIN GAUGE SENSORS

BACKGROUND

An inkjet printing system, as one example of a fluid ejection system, may include a printhead, an ink supply which supplies liquid ink to the printhead, and an electronic controller which controls the printhead. The printhead, as one example of a fluid ejection device, ejects drops of ink through a plurality of nozzles or orifices and toward a print medium, such as a sheet of paper, so as to print onto the print medium. In some examples, the orifices are arranged in at least one column or array such that properly sequenced ejection of ink from the orifices causes characters or other images to be printed upon the print medium as the printhead and the print medium are moved relative to each other.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

The health of the nozzles of a fluid ejection die may be determined by monitoring their drop ejection performance. Accordingly, disclosed herein is a fluid ejection system including a fluid ejection die. The fluid ejection die includes a plurality of nozzles to eject fluid drops and a corresponding plurality of strain gauge sensors to sense strain, where each strain gauge sensor is proximate a corresponding nozzle. The strain gauge sensors sense strain during firing of the nozzles to detect the health of each nozzle. The sensed strain may be used to determine whether a nozzle is clear or blocked, to determine a property of an ejected drop (e.g., drop mass, drop volume, or drop velocity), or to determine whether a nozzle fired or not. Operation of the fluid ejection system may be stopped, a user of the fluid ejection system may be alerted, or a nozzle may be disabled and/or replaced with another nozzle based on the determined health of each nozzle.

Figure 1:
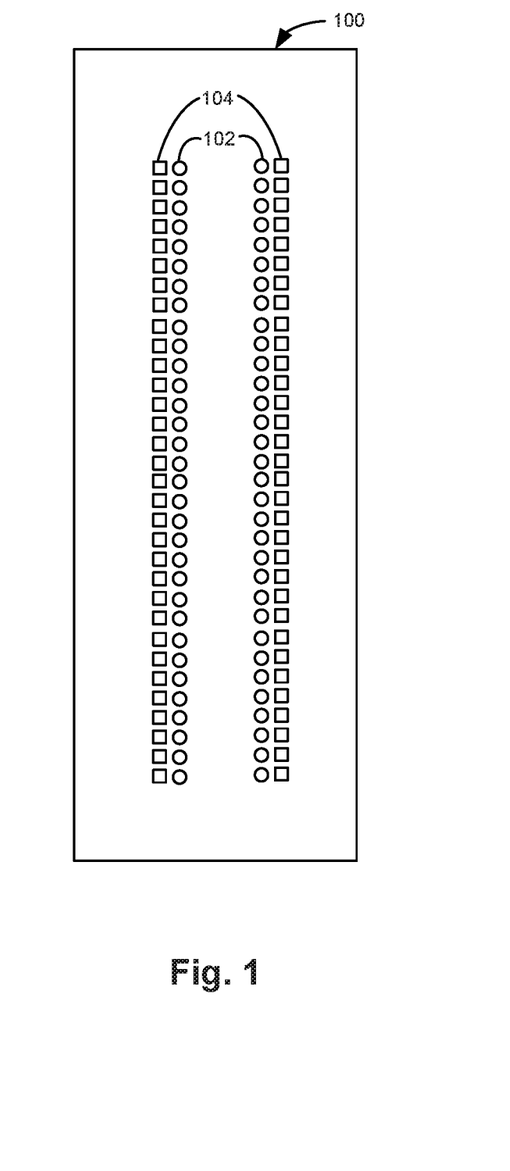
FIG. 1 illustrates a front view of one example of a fluid ejection die.

FIG. 1 illustrates a front view of one example of a fluid ejection die 100. Fluid ejection die 100 includes a plurality of nozzles 102 to eject fluid drops and a plurality of strain gauge sensors 104. Each strain gauge sensor 104 corresponds to a nozzle 102 and passes the sensed strain to a controller to determine the health of the nozzle based on the sensed strain. In one example, fluid ejection die 100 is a silicon die and each of the plurality of strain gauge sensors 104 is integrated within the die. Each strain gauge sensor 104 senses the strain within fluid ejection die 100 proximate a corresponding nozzle 102.

While fluid ejection die 100 includes a rectangular shape in this example, in other examples fluid ejection die 100 may have another suitable shape, such as a square shape. Fluid ejection die 100 may include any suitable number of nozzles 102 and a corresponding number of strain gauge sensors 104. While fluid ejection die 100 includes nozzles 102 arranged in two columns and strain gauge sensors 104 arranged in two corresponding columns, in other examples nozzles 102 and strain gauge sensors 104 may have other suitable arrangements, such as one column of nozzles and one corresponding column of strain gauge sensors or more than two columns of nozzles and more than two corresponding columns of strain gauge sensors. Also, while fluid ejection die 100 includes strain gauge sensors 104 aligned with respect to each other, in other examples, nozzles 102 and strain gauge sensors 104 may be staggered with respect to each other.

Figure 2A:
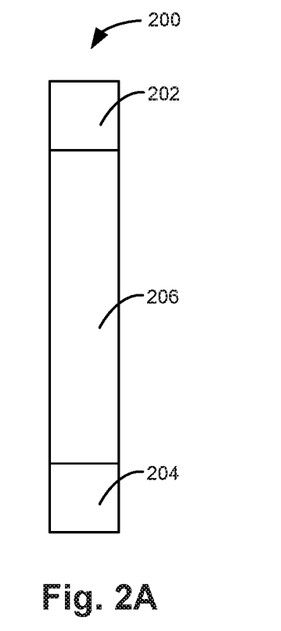
FIG. 2A illustrates one example of a strain gauge sensor.

FIG. 2A illustrates one example of a strain gauge sensor 200. In one example, strain gauge sensor 200 provides each strain gauge sensor 104 of fluid ejection die 100 previously described and illustrated with reference to FIG. 1. Strain gauge sensor 200 includes a first electrode 202, a second electrode 204, and a piezoelectric sensor element 206 electrically coupled between first electrode 202 and second electrode 204. Piezoelectric sensor element 206 exhibits a change in resistance in response to stress in one axis. Therefore, by biasing strain gauge sensor 200 (e.g., with a constant current) and measuring the voltage across piezoelectric sensor element 206, the strain on piezoelectric sensor element 206 may be sensed.

Figure 2B:
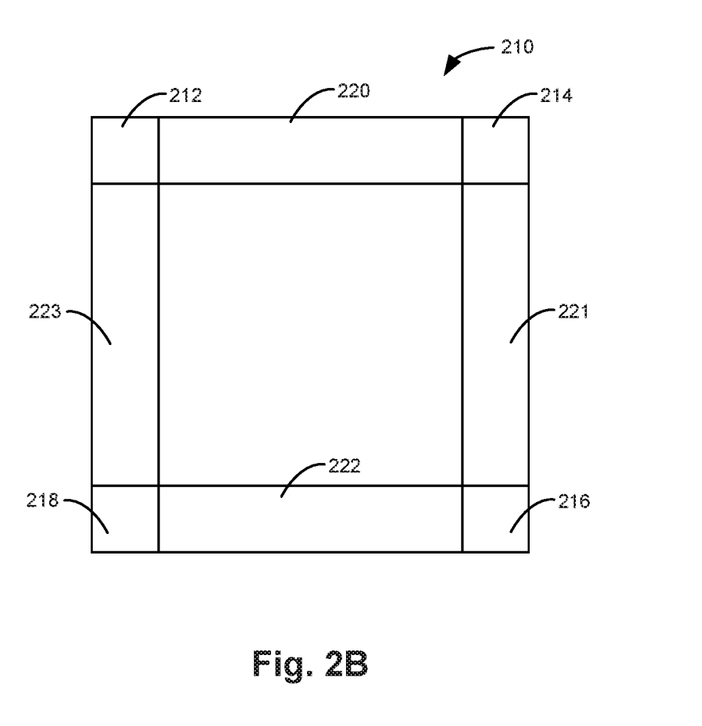
FIG. 2B illustrates another example of a strain gauge sensor.

FIG. 2B illustrates another example of a strain gauge sensor 210. In one example, strain gauge sensor 210 provides each strain gauge sensor 104 of fluid ejection die 100 previously described and illustrated with reference to FIG. 1. Strain gauge sensor 210 includes a first electrode 212, a second electrode 214, a third electrode 216, a fourth electrode 218, a first piezoelectric sensor element 220, a second piezoelectric sensor element 221, a third piezoelectric sensor element 222, and a fourth piezoelectric sensor element 223. First piezoelectric sensor element 220 is electrically coupled between first electrode 212 and second electrode 214. Second piezoelectric sensor element 221 is electrically coupled between second electrode 214 and third electrode 216. Third piezoelectric sensor element 222 is electrically coupled between third electrode 216 and fourth electrode 218. Fourth piezoelectric sensor element 223 is electrically coupled between fourth electrode 218 and first electrode 212.

Strain gauge sensor 210 exhibits a change in resistance in response to stress in two axes. Strain gauge sensor 210 may be configured in a Wheatstone bridge configuration in which an external biasing voltage is applied across two opposing electrodes (e.g., first electrode 212 and third electrode 216) while the voltage is measured across the other two opposing electrodes (e.g., second electrode 214 and fourth electrode 218). Therefore, by biasing strain gauge sensor 210 with an external voltage and measuring the voltage across piezoelectric sensor elements 220-223, the strain on strain gauge sensor 210 may be sensed.

Figure 3:
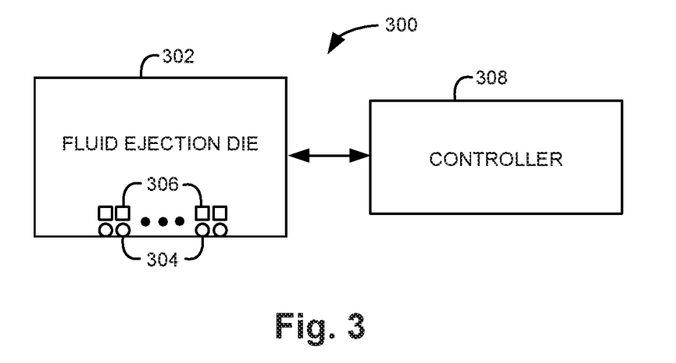
FIG. 3 is a block diagram illustrating one example of a fluid ejection system.

FIG. 3 is a block diagram illustrating one example of a fluid ejection system 300. Fluid ejection system 300 includes a fluid ejection die 302 and a controller 308. Fluid ejection die 302 includes a plurality of nozzles 304 to eject fluid drops and a corresponding plurality of strain gauge sensors 306 to sense strain. Each strain gauge sensor 306 is proximate a corresponding nozzle 304. In one example, each strain gauge sensor 306 is arranged beneath a corresponding nozzle 304. Controller 308 receives the sensed strain from each strain gauge sensor 306 to determine the health of each corresponding nozzle based on the sensed strain.

In one example, controller 308 determines whether each nozzle is clear or blocked based on the sensed strain. In another example, controller 308 determines a property of an ejected drop for each nozzle based on the sensed strain. The property of an ejected drop may be a drop mass, drop volume, or a drop velocity. In another example, controller 308 determines whether each nozzle has fired based on the sensed strain.

Figure 4:
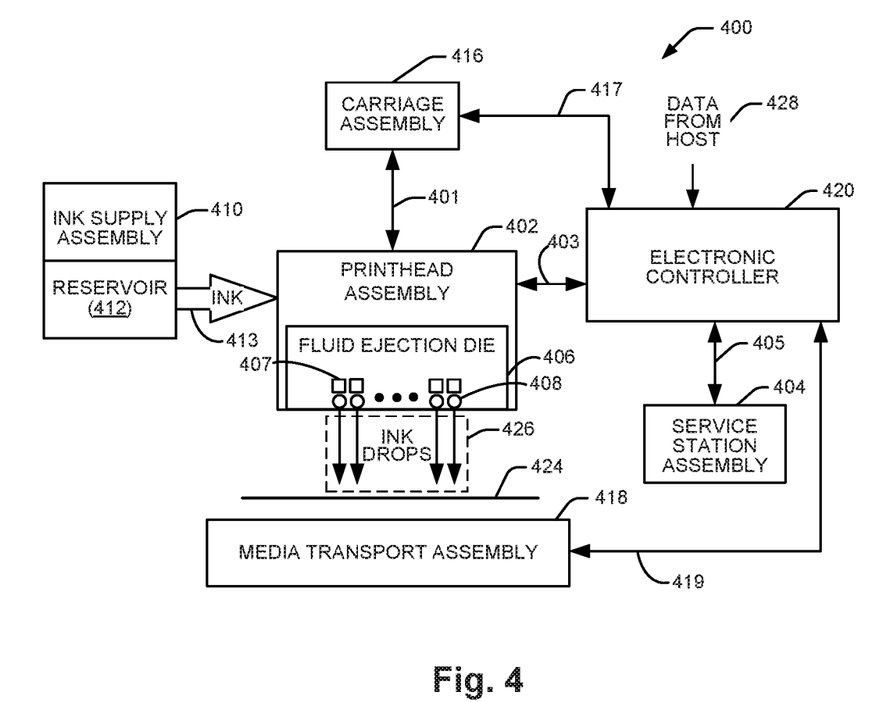
FIG. 4 is a block diagram illustrating another example of a fluid ejection system.

FIG. 4 is a block diagram illustrating another example a fluid ejection system 400. Fluid ejection system 400 includes a fluid ejection assembly, such as printhead assembly 402, and a fluid supply assembly, such as ink supply assembly 410. In the illustrated example, fluid ejection system 400 also includes a service station assembly 404, a carriage assembly 416, a print media transport assembly 418, and an electronic controller 420. While the following description provides examples of systems and assemblies for fluid handling with regard to ink, the disclosed systems and assemblies are also applicable to the handling of fluids other than ink.

Printhead assembly 402 includes at least one printhead or fluid ejection die 406 which ejects drops of ink or fluid through a plurality of orifices or nozzles 408. In one example, the drops are directed toward a medium, such as print media 424, so as to print onto print media 424. In one example, print media 424 includes any type of suitable sheet material, such as paper, card stock, transparencies, Mylar, fabric, and the like. In another example, print media 124 includes media for three-dimensional (3D) printing, such as a powder bed, or media for bioprinting and/or drug discovery testing, such as a reservoir or container. In one example, nozzles 408 are arranged in at least one column or array such that properly sequenced ejection of ink from nozzles 408 causes characters, symbols, and/or other graphics or images to be printed upon print media 424 as printhead assembly 402 and print media 424 are moved relative to each other. Fluid ejection die 406 also includes a plurality of strain gauge sensors 407 corresponding to the plurality of nozzles 408. Each strain gauge sensor 407 senses strain within fluid ejection die 406 to determine the health of each corresponding nozzle 408.

Ink supply assembly 410 supplies ink to printhead assembly 402 and includes a reservoir 412 for storing ink. As such, in one example, ink flows from reservoir 412 to printhead assembly 402. In one example, printhead assembly 402 and ink supply assembly 410 are housed together in an inkjet or fluid-jet print cartridge or pen. In another example, ink supply assembly 410 is separate from printhead assembly 402 and supplies ink to printhead assembly 402 through an interface connection 413, such as a supply tube and/or valve.

Carriage assembly 416 positions printhead assembly 402 relative to print media transport assembly 418 and print media transport assembly 418 positions print media 424 relative to printhead assembly 402. Thus, a print zone 426 is defined adjacent to nozzles 408 in an area between printhead assembly 402 and print media 424. In one example, printhead assembly 402 is a scanning type printhead assembly such that carriage assembly 416 moves printhead assembly 402 relative to print media transport assembly 418. In another example, printhead assembly 402 is a non-scanning type printhead assembly such that carriage assembly 416 fixes printhead assembly 402 at a prescribed position relative to print media transport assembly 418.

Service station assembly 404 provides for spitting, wiping, capping, and/or priming of printhead assembly 402 to maintain the functionality of printhead assembly 402 and, more specifically, nozzles 408. For example, service station assembly 404 may include a rubber blade, wiper, or roller which is periodically passed over printhead assembly 402 to wipe and clean nozzles 408 of excess ink. In addition, service station assembly 404 may include a cap that covers printhead assembly 402 to protect nozzles 408 from drying out during periods of non-use. In addition, service station assembly 404 may include a spittoon into which printhead assembly 402 ejects ink during spits to insure that reservoir 412 maintains an appropriate level of pressure and fluidity, and to insure that nozzles 408 do not clog or weep. Functions of service station assembly 404 may include relative motion between service station assembly 404 and printhead assembly 402.

Electronic controller 420 communicates with printhead assembly 402 through a communication path 403, service station assembly 404 through a communication path 405, carriage assembly 416 through a communication path 417, and print media transport assembly 418 through a communication path 419. In one example, when printhead assembly 402 is mounted in carriage assembly 416, electronic controller 420 and printhead assembly 402 may communicate via carriage assembly 416 through a communication path 401. Electronic controller 420 may also communicate with ink supply assembly 410 such that, in one implementation, a new (or used) ink supply may be detected.

Electronic controller 420 receives data 428 from a host system, such as a computer, and may include memory for temporarily storing data 428. Data 428 may be sent to fluid ejection system 400 along an electronic, infrared, optical or other information transfer path. Data 428 represent, for example, a document and/or file to be printed. As such, data 428 form a print job for fluid ejection system 400 and includes at least one print job command and/or command parameter.

In one example, electronic controller 420 provides control of printhead assembly 402 including timing control for ejection of ink drops from nozzles 408. As such, electronic controller 420 defines a pattern of ejected ink drops which form characters, symbols, and/or other graphics or images on print media 424. Timing control and, therefore, the pattern of ejected ink drops, is determined by the print job commands and/or command parameters. In one example, logic and drive circuitry forming a portion of electronic controller 420 is located on printhead assembly 402. In another example, logic and drive circuitry forming a portion of electronic controller 420 is located off printhead assembly 402.

Electronic controller 420 may also control the timing of the reading of the sensed strain from each of the plurality of strain gauge sensors 407, such as by coordinating the reading of the sensed strain with the ejection of ink drops from nozzles 408. Electronic controller 420 receives the sensed strain from each of the plurality of strain gauge sensors 407 and determines the health of each nozzle 408 based on the sensed strain. In one example, electronic controller 420 determines whether each nozzle is clear or blocked based on the sensed strain. In another example, electronic controller 420 determines a property of an ejected drop for each nozzle based on the sensed strain. The property of an ejected drop may be a drop mass or a drop velocity. In another example, electronic controller 420 determines whether each nozzle has fired based on the sensed strain.

Figure 5A:
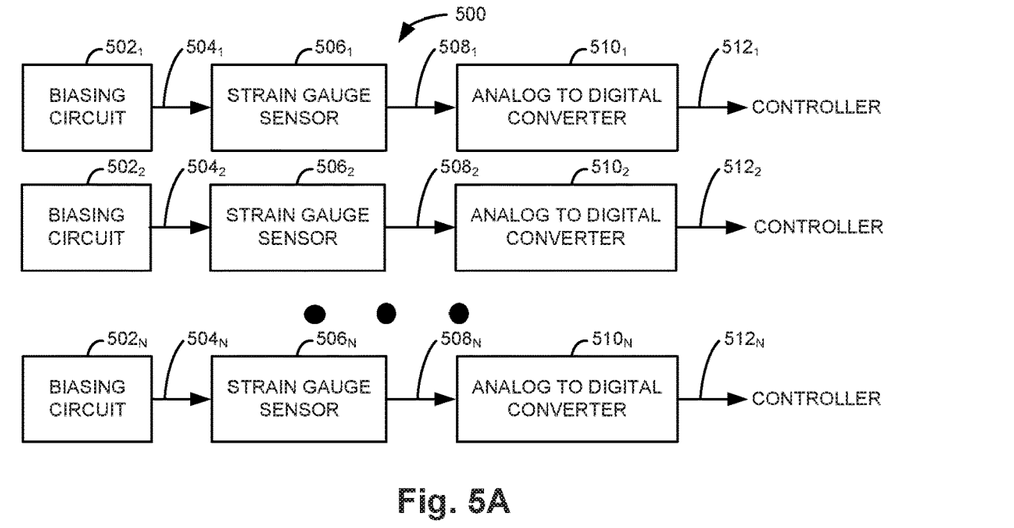
FIG. 5A is a block diagram illustrating one example of a circuit for processing signals from a plurality of strain gauge sensors.

FIG. 5A is a block diagram illustrating one example of a circuit 500 for processing signals from a plurality of strain gauge sensors. Circuit 500 includes biasing circuits $502_1$ to $502_N$, strain gauge sensors $506_1$ to $506_N$, and analog to digital converters $510_1$ to $510_N$, where "N" is any suitable number of strain gauge sensors on a fluid ejection die. The signals from each strain gauge sensor are passed to a controller, such as controller 308 previously described and illustrated with reference to FIG. 3 or electronic controller 420 previously described and illustrated with reference to FIG. 4. Strain gauge sensors $506_1$ to $506_N$ are integrated on a fluid ejection die, such as fluid ejection die 100 previously described and illustrated with reference to FIG. 1. Biasing circuits $502_1$ to $502_N$ and analog to digital converters $510_1$ to $510_N$ may be integrated in the fluid ejection die, in a printhead assembly, in other components of the fluid ejection system, or in a combination thereof.

Each biasing circuit $502_1$ to $502_N$ is electrically coupled to a strain gauge sensor $506_1$ to $506_N$ through a signal path $504_1$ to $504_N$, respectively. Each strain gauge sensor $506_1$ to $506_N$ is electrically coupled to an analog to digital converter $510_1$ to $510_N$ through a signal path $508_1$ to $508_N$, respectively. Each analog to digital converter $510_1$ to $510_N$ is electrically coupled to the controller through a signal path $512_1$ to $512_N$, respectively.

Each biasing circuit $502_1$ to $502_N$ provides a biasing voltage or current to a corresponding strain gauge sensor $506_1$ to $506_N$. Each strain gauge sensor $506_1$ to $506_N$ may be provided by a strain gauge sensor 200 previously described and illustrated with reference to FIG. 2A or a strain gauge sensor 210 previously described and illustrated with reference to FIG. 2B. The voltage signal from each strain gauge sensor $506_1$ to $506_N$ is converted to a digital signal by a corresponding analog to digital converter $510_1$ to $510_N$. In one example, each analog to digital converter $510_1$ to $510_N$ is a comparator that compares the voltage signal from each strain gauge sensor $506_1$ to $506_N$ to a threshold to provide a corresponding digital signal. The digital signal corresponding to the sensed strain of each strain gauge sensor $506_1$ to $506_N$ is then passed to the controller. In this way, the strain of each strain gauge sensor may be sensed simultaneously.

Figure 5B:
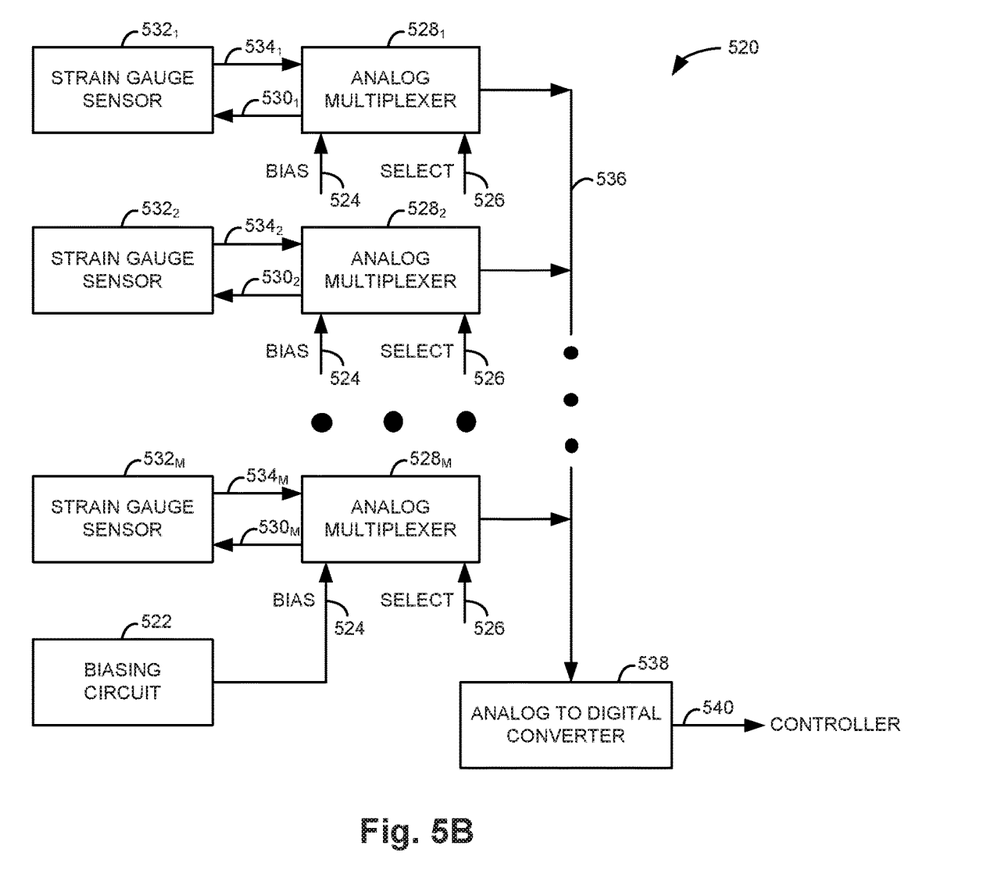
FIG. 5B is a block diagram illustrating another example of a circuit for processing signals from a plurality of strain gauge sensors.

FIG. 5B is a block diagram illustrating another example of a circuit 520 for processing signals from a plurality of strain gauge sensors. Circuit 520 includes a biasing circuit 522, analog multiplexers $528_1$ to $528_M$, strain gauge sensors $532_1$ to $532_M$, and an analog to digital converter 538, where "M" is any suitable number of strain gauge sensors on a fluid ejection die. The signals from each strain gauge sensor are passed to a controller, such as controller 308 previously described and illustrated with reference to FIG. 3 or electronic controller 420 previously described and illustrated with reference to FIG. 4. Strain gauge sensors $532_1$ to $532_M$ are integrated on a fluid ejection die, such as fluid ejection die 100 previously described and illustrated with reference to FIG. 1. Biasing circuit 522, multiplexers $528_1$ to $528_M$, and analog to digital converter 538 may be integrated in the fluid ejection die, in a printhead assembly, in other components of the fluid ejection system, or in a combination thereof.

Biasing circuit 522 is electrically coupled to each analog multiplexer $528_1$ to $528_M$ through a signal path 524. Each analog multiplexer $528_1$ to $528_M$ also receives a select signal through a signal path 526. Each analog multiplexer $528_1$ to $528_M$ is electrically coupled to a strain gauge sensor $532_1$ to $532_M$ through a signal path $530_1$ to $530_M$, respectively. Each strain gauge sensor $532_1$ to $532_M$ is electrically coupled to an analog multiplexer $528_1$ to $528_M$ through a signal path $534_1$ to $534_M$, respectively. Each analog multiplexer $528_1$ to $528_M$ is electrically coupled to analog to digital converter 538 through a signal path 536. Analog to digital converter 538 is electrically coupled to the controller through a signal path 540.

Biasing circuit 522 provides a biasing voltage or current to each analog multiplexer $528_1$ to $528_M$. In response to the select signal on signal path 526 corresponding to an analog multiplexer $528_1$ to $528_M$, the selected analog multiplexer $528_1$ to $528_M$ passes the biasing voltage or current to the corresponding strain gauge sensor $532_1$ to $532_M$ through the corresponding signal path $530_1$ to $530_M$. Each strain gauge sensor $532_1$ to $532_M$ may be provided by a strain gauge sensor 200 previously described and illustrated with reference to FIG. 2A or a strain gauge sensor 210 previously described and illustrated with reference to FIG. 2B. The voltage signal from the selected strain gauge sensor $532_1$ to $532_M$ is passed to the selected analog multiplexer $528_1$ to $528_M$ through the corresponding signal path $534_1$ to $534_M$. The selected analog multiplexer $528_1$ to $528_M$ then passes the voltage signal to analog to digital converter 538. Analog to digital converter 538 converts the voltage signal to a digital signal. The digital signal corresponding to the sensed strain of the selected strain gauge sensor $532_1$ to $532_M$ is then passed to the controller. In this way, a single biasing circuit and a single analog to digital converter may be used to sense the strain of multiple strain gauge sensors by sensing the strain of one strain gauge sensor at a time.

Figure 6:
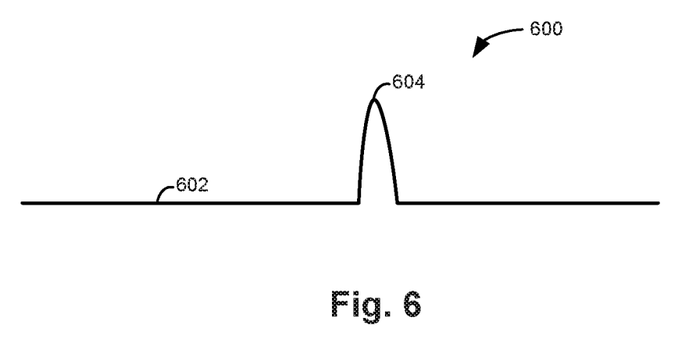
FIG. 6 illustrates one example of a strain gauge sensor signal corresponding to a nozzle firing event.

FIG. 6 illustrates one example of a strain gauge sensor signal 600 corresponding to a nozzle firing event. Prior to a firing event, the strain gauge sensor outputs a baseline strain indicated at 602. The baseline strain indicated at 602 may be sensed during a fluid ejection system idle time when the fluid ejection system is neither operating nor being serviced. Upon a nozzle firing event in which fluid is ejected from the fluid ejection die, the strain gauge sensor outputs a signal that rises rapidly to a peak value as indicated at 604 and then falls rapidly back to the baseline strain 602. The peak value, width, and/or rate of change at 604 may be used to determine the health of the nozzle. The peak value at 604 may be compared to at least one threshold to determine whether the corresponding nozzle is clear or blocked, to determine a property of an ejected drop (e.g., drop mass or drop velocity) from the corresponding nozzle, or to determine whether the corresponding nozzle has fired. A lack of significant change in the sensed strain from the baseline strain when a change in strain is expected may also be used to indicate the health of the nozzle.

Figure 7:
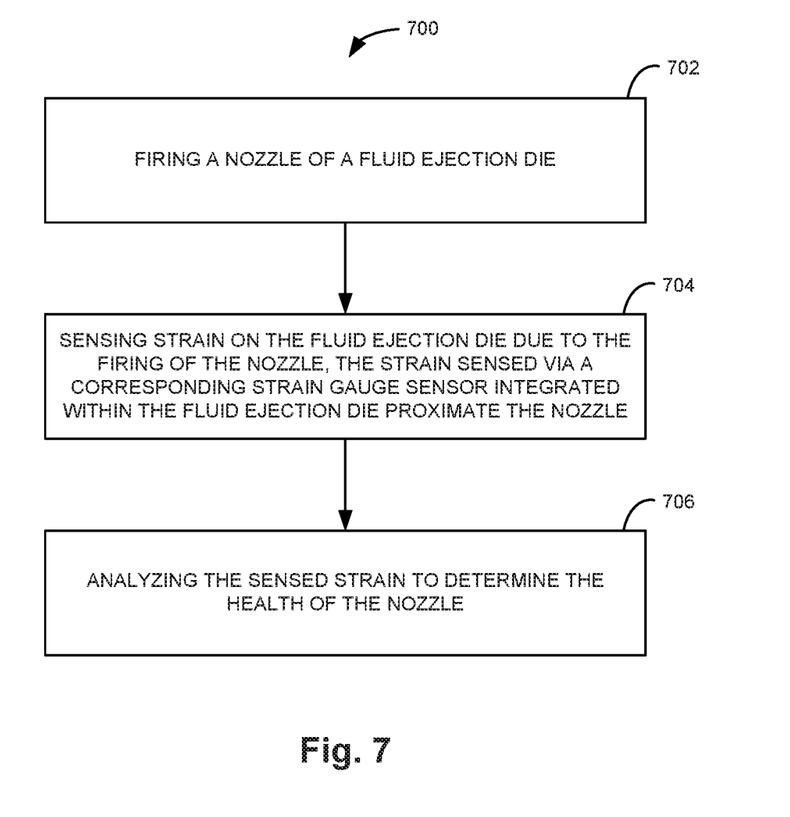
FIG. 7 is a flow diagram illustrating one example of a method for maintaining a fluid ejection system.

FIG. 7 is a flow diagram illustrating one example of a method 700 for maintaining a fluid ejection system. At 702, method 700 includes firing a nozzle of a fluid ejection die. At 704, method 700 includes sensing strain on the fluid ejection die due to the firing of the nozzle, the strain sensed via a corresponding strain gauge sensor integrated within the fluid ejection die proximate the nozzle. At 706, method 700 includes analyzing the sensed strain to determine the health of the nozzle.

In one example, analyzing the sensed strain to determine the health of the nozzle includes analyzing the sensed strain to determine whether the nozzle is clear or blocked. In another example, analyzing the sensed strain to determine the health of the nozzle includes analyzing the sensed strain to determine a property of an ejected drop from the nozzle. Method 700 may further include alerting a user of the fluid ejection system based on the determined health of the nozzle. Further, method 700 may include disabling and/or replacing the nozzle based on the determined health of the nozzle. In one example, replacing the nozzle includes substituting another nozzle of the fluid ejection die for the nozzle determined to have poor health.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A fluid ejection die comprising:
a plurality of nozzles to eject fluid drops; and
a plurality of strain gauge sensors to sense strain where each strain gauge sensor corresponds to a single nozzle and passes the sensed strain to a controller to determine the health of the nozzle based on the sensed strain.

2. The fluid ejection die of claim 1, wherein each strain gauge sensor comprises a piezoelectric sensor element.

3. The fluid ejection die of claim 1, wherein each strain gauge sensor comprises four piezoelectric sensor elements in a Wheatstone bridge configuration.

4. The fluid ejection die of claim 1, wherein each strain gauge sensor is arranged beneath a nozzle.

5. The fluid ejection die of claim 1, wherein the plurality of nozzles comprises a number of nozzles equal to a number of strain gauge sensors of the plurality of strain gauge sensors.

6. A fluid ejection system comprising:
a fluid ejection die comprising a plurality of nozzles to eject fluid drops and a corresponding plurality of strain gauge sensors to sense strain, each strain gauge sensor proximate to and corresponding to a single nozzle; and
a controller to receive the sensed strain from each strain gauge sensor to determine the health of each corresponding nozzle based on the sensed strain.

7. The fluid ejection system of claim 6, wherein the controller is to determine whether each nozzle is clear or blocked based on the sensed strain.

8. The fluid ejection system of claim 6, wherein the controller is to determine a property of an ejected drop for each nozzle based on the sensed strain.

9. The fluid ejection system of claim 8, wherein the controller is to determine a drop mass or a drop velocity of an ejected drop for each nozzle based on the sensed strain.

10. The fluid ejection system of claim 6, wherein the controller is to determine whether each nozzle has fired based on the sensed strain.

11. The fluid ejection system of claim 6, wherein the plurality of nozzles comprises a number of nozzles equal to a number of strain gauge sensors of the plurality of strain gauge sensors.

12. A method for maintaining a fluid ejection system, the method comprising:
firing a nozzle of a fluid ejection die;
sensing strain on the fluid ejection die due to the firing of the nozzle, the strain sensed via a corresponding strain gauge sensor integrated within the fluid ejection die proximate the nozzle and corresponding to a single nozzle; and
analyzing the sensed strain to determine the health of the nozzle.

13. The method of claim 12, wherein analyzing the sensed strain to determine the health of the nozzle comprises analyzing the sensed strain to determine whether the nozzle is clear or blocked.

14. The method of claim 12, wherein analyzing the sensed strain to determine the health of the nozzle comprises analyzing the sensed strain to determine a property of an ejected drop from the nozzle.

15. The method of claim 12, further comprising:
alerting a user of the fluid ejection system based on the determined health of the nozzle.

16. The method of claim 12, further comprising:
servicing the nozzle based on the determined health of the nozzle.

17. The method of claim 12, further comprising:
disabling and/or replacing the nozzle based on the determined health of the nozzle.

18. The method of claim 12, wherein the fluid ejection die comprises a plurality of nozzles and a plurality of strain gauge sensors, and
wherein the plurality of nozzles comprises a number of nozzles equal to a number of strain gauge sensors of the plurality of strain gauge sensors.

* * * * *